Oct. 3, 1972  J. A. VOSS ET AL  3,695,970
REINFORCED HYGIENIC MEDIUM APPLICATOR TUBES AND
METHODS FOR FABRICATING SAME
Original Filed May 10, 1968                    3 Sheets-Sheet 1

INVENTORS.
JOSEPH A. VOSS
CARL W. JOHNSON

FRASER & BOGUCKI

ATTORNEYS

Oct. 3, 1972    J. A. VOSS ET AL    3,695,970
REINFORCED HYGIENIC MEDIUM APPLICATOR TUBES AND
METHODS FOR FABRICATING SAME
Original Filed May 10, 1968    3 Sheets-Sheet 2

INVENTORS.
JOSEPH A. VOSS
CARL W. JOHNSON

FRASER & BOGUCKI
ATTORNEYS

United States Patent Office 3,695,970
Patented Oct. 3, 1972

3,695,970
REINFORCED HYGIENIC MEDIUM APPLICATOR TUBES AND METHODS FOR FABRICATING SAME
Joseph A. Voss, Denver, Colo., and Carl W. Johnson, Neenah, Wis.; said Voss assignor to Kimberly-Clark Corporation, Neenah, Wis.
Original application May 10, 1968, Ser. No. 728,290. Divided and this application Apr. 20, 1970, Ser. No. 38,616
Int. Cl. H05b 9/00; A61f 13/20
U.S. Cl. 156—272
4 Claims

ABSTRACT OF THE DISCLOSURE

A tubular, hygienic medium applicator device is disclosed including a thin-walled, ring-reinforced external tube. The reinforcing ring is a laminated structure composed of five concentric plies including three plies of paper surrounding a ply of electrically conductive foil coated on its inner surface with a ply of thermoplastic resin material. In the fabrication of the reinforced tube, the ring is telescoped over the exterior surface of the external tube flush with the rear edge thereof. The ring is then bonded in place by inductively heating the foil to heat the thermoplastic resin and fuse the resin to the tube surface.

CROSS REFERENCE TO RELATED APPLICATION

This application is a division of application Ser. No. 728,290, filed May 10, 1968 by the inventors herein, said application having issued as U.S. Pat. No. 3,572,339, dated Mar. 23, 1971.

BACKGROUND OF THE INVENTION

This invention relates to hygienic applicator devices and particularly to reinforced tubular structures for use in such devices.

U.S. Pat. Nos. 3,204,635 and 3,358,354, issued to the present inventors on Sept. 7, 1965 and Dec. 19, 1967, respectively, disclose an improved hygienic medium applicator utilizing an external tube having a tapered forward tip, and a method for forming the tapered configuration. The tapered tip of the tube facilitates insertion of the applicator and comprises a plurality of dovetailed folds or pleats providing a structure easily opened from the inside, thereby permitting the user to eject the hygienic medium without having to exert undue force.

U.S. Patent No. 3,568,577, issued to the present inventors on Mar. 9, 1971, and entitled "Applicators for Catamenial Devices," discloses apparatus for forming the forward end of the external tube into the final tapered shape. The process used to form the taper, in combination with the proper tube material, as disclosed in now U.S. Pat. No. 3,581,744 of the present inventors, issued June 1, 1971 and entitled "Laminated Tube Structure," provides a tapered structure having substantially no tendency to reopen once formed, yet providing little resistance when the hygienic medium is moved through during ejection.

It is most desirable from the standpoint of consumer acceptance that the force necessary to spread open the forward end of the external tube during ejection of the hygienic medium be minimized. By way of specific example, when the hygienic medium comprises a tampon, the required force should be one pound or less.

It will be appreciated that the use of a thin-walled external tube is desirable because it is more apt to provide the required yieldability of the pleated, tapered tip and is also desirable because the overall diameter of the applicator is minimized while the size of the hygienic medium accommodated therein can be maximized. The net result is a product which not only inserts easily but simultaneously is adapted to carry a hygienic medium having the greatest fluid absorbing or medicating capabilities and has structural characteristics which facilitate the formation of the pleated forward end and opening thereof when the hygienic medium is expelled.

The thin-walled construction of the external applicator tube, however, makes it susceptible to deformation under the gripping force normally applied during use of the applicator. Tube wall deformation tends to increase the force required to eject the hygienic medium because of increased frictional resistance between the sliding and stationary components of the applicator, especially in those applicators employing a hygienic medium ejecting tube telescoped within the external tube in close fitting relation.

By fastening a ring about the external tube adjacent the rear extremity thereof, as disclosed in U.S. Pat. No. 3,347,234 issued on Oct. 17, 1967 to J. A. Voss, one of the inventors herein, the external tube may be reinforced to minimize deformation resulting from gripping pressure applied to the external tube during use of the applicator. The ring also provides a means for securely gripping the applicator to assure proper orientation during insertion.

Application U.S. Pat. No. 3,568,577, referenced earlier, discloses apparatus for automatically applying the rings to the external tubes by using a liquid adhesive. Although the use of liquid adhesive is generally satisfactory for joining the tubes and rings on a low production basis, this approach is decidedly less suitable for high production. The maintenance of proper adhesive viscosity and other parameters to assure uniformity of the final product, the necessity of periodically replenishing the adhesive supply and the time which must be allotted for adhesive drying, all contribute to increased production time and manufacturing costs.

SUMMARY OF THE INVENTION

One aspect of the present invention relates to a novel method for attaching a reinforcing ring to a thin-walled hygienic medium applicator tube. The method provides a production rate of tube/ring assemblies considerably higher than heretofore possible and substantially reduces manufacturing costs while assuring uniformity of the final products.

According to one specific example of the method, a vertical tube support in the form of a cylindrical shaft is provided for slidably receiving external applicator tubes, in succession, and holding each tube while a reinforcing ring is bonded in place. The ring, having an inside diameter dimensioned to provide a snug, frictional fit with the external tube, is first dropped onto a circumferential shoulder projecting from the shaft. The applicator tube is then slipped over the shaft and pushed downwardly until the rear edge of the tube comes to rest against the shoulder, the ring having telescoped over the rear portion of the tube.

The ring, which forms another aspect of the present invention, is a laminated structure which, according to one specific embodiment, comprises two major composite layers, a two-ply outer layer and a three-ply inner layer. The outer layer is composed of two adhesively bonded paper plies. The inner layer is composed of a ply of electrically conductive foil having a paper ply bonded to its exterior surface and on its interior surface having a thin ply in the form of a thermoplastic resin coating for effecting the bond between the ring and the tube.

As a last step in the manufacture of the tube and ring assembly, the ring and the tube are joined by inductively heating the conductive foil to a temperature at which the thermoplastic coating melts and fuses with the exterior surface of the applicator tube. Bonding may be accomplished by simultaneously heating several points about the ring or by intermittently rotating the tube support shaft relative to a single induction coil, energized in timed relation with the intermittent rotation of the shaft, to inductively heat localized areas of the foil, thereby providing bonding in a plurality of spots about the ring. Alternatively, the support shaft may be continuously rotated and the foil continuously heated by induction to provide a substantantially unbroken bond between the ring and the tube.

BRIEF DESCRIPTION OF THE DRAWINGS

A better understanding of the invention may be had by reference to the detailed description which follows, taken in conjunction with the accompanying drawings in which.

DETAILED DESCRIPTION OF THE INVENTION

By way of example, this description will be limited to catamenial applicator devices for the insertion of tampons. It will be understood, however, that the invention is equally applicable to other hygienic medium devices such as suppository applicators and the appended claims are intended to encompass all such equivalent devices.

Figure 1:
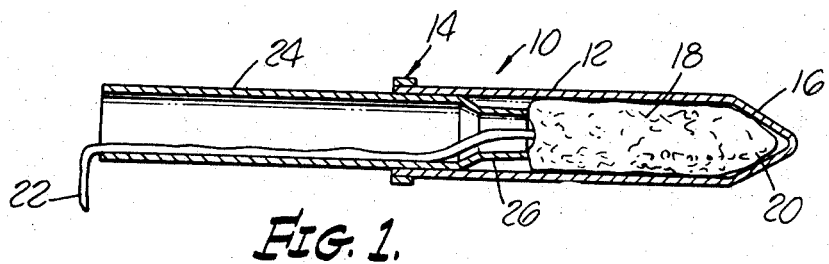
FIG. 1 is a longitudinal cross-section view of a tampon applicator device having a reinforcing ring about the rear portion of the external tube.

Referring to FIG. 1, a catamenial tampon applicator device 10, incorporating features of the present invention, is shown. The device 10 includes an elongated, external tube 12 which has a relatively thin wall and may be in the form of a laminated tubular structure of the kind disclosed in detail in the aforementioned U.S. Pat. No. 3,581,744. Because of its thin wall, the tube 12 may be subject to deformation when grasped by the fingers during use of the device. The tube is therefore provided with a reinforcing ring, designated generally by the reference number 14, mounted about the exterior surface of the tube 12, flush with the rear extremity thereof. The ring 14 serves not only to reinforce the external tube 12, but provides a secure, non-slip gripping means and also facilitates orientation of the applicator to properly direct the injection of the tampon into the vagina. The tube 12 further includes a tapered forward tip 16 which permits easy and rapid insertion without discomfort or irritation to the user. The tapered tip may be formed, for example, by folding the forward end into a plurality of pleats in the manner disclosed in the aforementioned U.S. Pats. 3,204,635 and 3,568,577.

The device 10 also includes a tampon 18 housed in the forward portion of the external tube 12. The forward end 20 of the tampon 18 is tapered to substantially conform to the configuration of the interior of the tapered tip 16. A draw string 22 is connected to the rear extremity of the tampon 18 and extends rearwardly therefrom.

The applicator 10 further includes tampon-ejecting means disposed within the rear portion of the external tube 12. The tampon-ejecting means may take the form of an internal tube 24 slidably received, in telescoping relation, within the tube 12. The internal tube 24 is provided with a reduced diameter forward section 26 which may be formed in a manner similar to that mentioned in connection with the tapered tip 16 of the external tube 12. The reduced diameter forward section 26 eliminates any frictional interference which might otherwise result from burrs or other projections riding in contact with the interior surface of the tube 12. It also precludes any tendency on the part of the tampon material to catch or bind between the adjacent surfaces of the internal and external tubes.

The tube 24 may be constructed from any suitable material; as explained in greater detail in the aforementioned now U.S. Pat. No. 3,581,744, it may comprise a laminated structure similar to that of the external tube 12.

Figure 2:
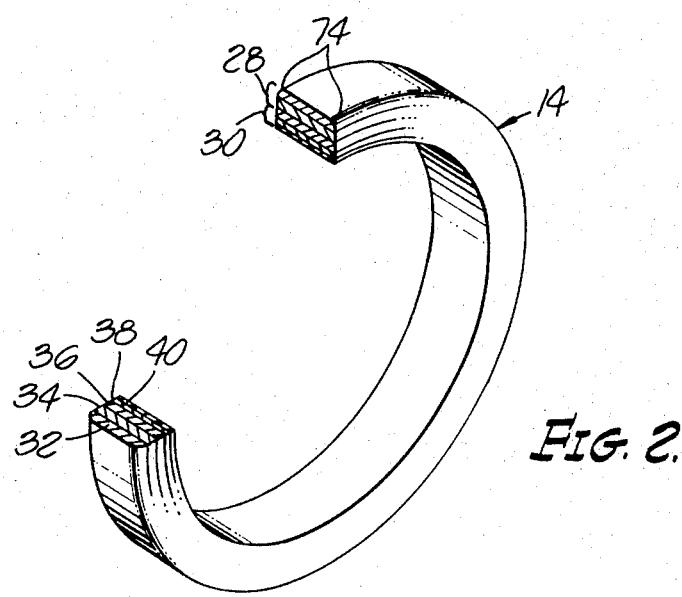
FIG. 2 is an enlarged, partially cut-away, perspective view of an example of a reinforcing ring in accordance with one aspect of the present invention.

FIG. 2 shows an enlarged view of an example of a reinforcing and gripping ring 14 forming one aspect of the present invention. According to one specific example, the overall dimensions of the ring include an inside diameter of about .605 inch and a length of about .188 inch, or about 3/16 inch. The inside diameter of the ring 14 and the outside diameter of the external tube 12 are such that a snug, frictional fit between the ring and tube is obtained when the ring is telescoped over the tube.

The ring 14 depicted in FIG. 2 is a laminated structure consisting of a total of five plies which may be broken down into two major composite layers, an outer layer 28 and an inner layer 30. The outer layer 28 can be a single paper ply, but preferably is composed of two plies 32 and 34 each having a thickness of about .006 inch and constituting a relatively hard, uncoated, unfinished paper, such as 25 lb. white kraft. The dual ply construction contributes substantially to the strength of the ring 14.

The plies 32 and 34 are bonded together with a water-soluble glue, as are the plies forming the external and internal tubes 12 and 24, to insure rapid separation of the plies in water. This facilitates the subsequent disintegration of the plies and enhances the disposability of the overall applicator assembly 10 in a completely sanitary manner.

The inner layer 30 includes an outermost ply 36 of .006 inch thick paper of the same weight and quality as that used for the plies 32 and 34, and bonded to the ply 34 with a water soluble adhesive. The layer 30 further includes an intermediate ply 38, made of an electrically conductive material and an innermost ply 40 which is an extruded coating of thermoplastic resin material on the interior surface of the electrically conductive ply 38. The intermediate ply 38, according to one specific example, is made of aluminum foil, about .00035 inch thick, having its exterior surface suitably bonded to the outermost ply 36 and provided with a polyethylene film on its interior surface which engages the exterior surface of the tube 12. The inner layer 30 may be obtained commercially as a composite sheet from Thilmany Paper Company of Kaukauna, Wisc., U.S.A.

It will be seen that the overall thickness of the ring 14 is slightly more than .018 inch and the laminated structure considerably strengthens the external tube and provides substantial resistance to deformation. The ring is thick enough to form a projecting structure of sufficient size so as to afford a good gripping surface and is readily detected by touch, this being particularly advantageous in terms of the proper orientation of the applicator during ejection of the tampon when, as is usually the case, the applicator is out of the direct line of vision of the user. Because the ring 14 also marks the rear extremity of the external tube 12, it tells the user at all times the relative position between the external and internal tubes 12 and 24. It will further be noted that the rear extremities of the tube 12 and the ring 14 are flush, thereby furnishing a relatively large surface area against which the finger, used to push the internal tube 24 forward, comes in contact when the tube 24 is fully advanced.

Figure 7:
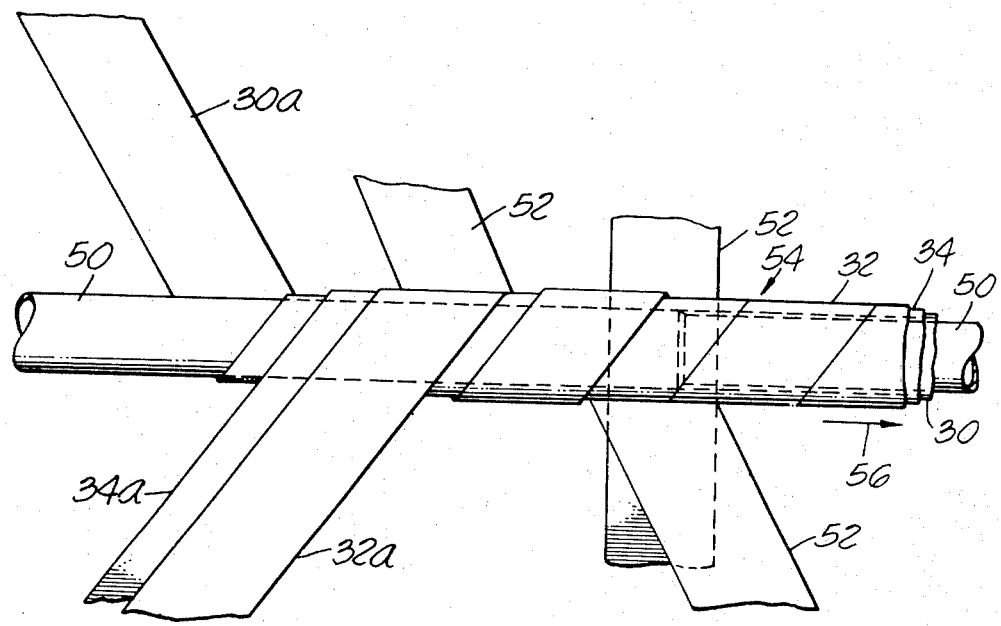
FIG. 7 is a plan view of a portion of a tube winding apparatus for forming tube stock from which the reinforcing rings are cut; and, FIG. 8 is a front elevation view, in section, of a portion of a tube cutting apparatus for severing rings from tube stock.
Figure 8:
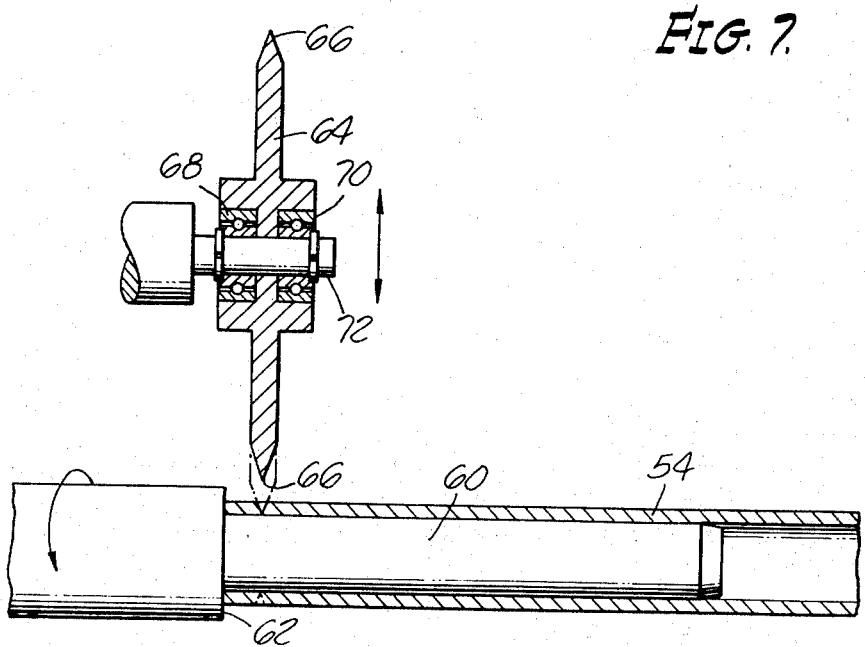

Turning briefly to FIGS. 7 and 8, there are illustrated examples of apparatus which may be used in the fabrication of the rings 14. The rings are most conveniently cut from tube stock produced by the well known method of winding individual strips, forming the various plies of the final product, about a fixed mandrel in helical fashion. Apparatus of this type, used in connection with the fabrication of tube stock for external and internal applicator tubes, is described U.S. Pat. No. 3,581,744. A portion of such apparatus is depicted in FIG. 7.

A composite strip 30a, from which the aforedescribed inner layer 30 is formed, a paper strip 32a for forming the outermost ply 32 of the outer layer 28 and a paper strip 34a for forming the innermost ply 34 of the outer layer 28, are drawn from suitable supply reels (not shown) under appropriate tensions and wound about a fixed, horizontal mandrel 50 by means of an endless belt 52 wrapped about the mandrel in helical fashion. The belt 52 is continuously moved at a suitable winding speed by a motor-driven pulley means (not shown). The upper and lower faces of the strip 34a, to which the strip 32a and layer 30a, respectively, are bonded, are impregnated with an adhesive prior to the arrival of the strip 34a at the mandrel 50. The upper face of the layer 30a which rides in contact with the surface of the mandrel 50, is suitably lubricated to reduce drag forces between these surfaces.

The formed tube stock 54 is advanced along the mandrel 50 toward the right as indicated by the arrow 56 and off the end of the mandrel where it is cut into convenient lengths of two feet, for example.

Individual rings may be cut from the tube stock 54 by any suitable machine. An example of an apparatus, by which the rings are severed by score cutting, is shown in FIG. 8. A length of the tube stock 54 is slipped onto a rotatably mounted arbor 60 until the end of the tube stock contacts a shoulder 62 that projects from the arbor 60 and serves as a longitudinal locating surface for the tube stock. The tube stock is held against rotation relative to the arbor by friction alone. Mounted adjacent the arbor 60, for rotation about an axis parallel with that of the arbor, is a cutter wheel 64 having a sharp peripheral edge 66. The wheel 64 is carried by ball bearings 68 and 70 supported by a shaft 72 mounted for reciprocation toward and away from the arbor 60. The plane of the cutting edge 66 is spaced from the shoulder 62 a distance equal to the desired length of the ring.

In operation, the cutter wheel 64 is moved toward the arbor 60 until the peripheral edge 66 comes into contact with the exterior surface of the tube 54. When the cutting wheel 64 makes contact with the outer surface of the tube stock 54, the wheel begins to rotate; under additional pressure the cutting wheel edge 66 scores the tube stock wall and penetrates until the tube wall is completely cut through. The cutting operation produces a somewhat rounded corner 74 on the final ring as shown in FIG. 2.

After the cut has been made and the cutting wheel 64 retracted, the remaining tube stock is then removed from the arbor leaving the severed ring, which is then removed. The length of the tube stock which is left is then once again slipped over the arbor against the shoulder and next ring is cut, and so on.

As an alternative, the cutting wheel 64 can be indexed along the arbor 60 between cuts to separate the tube stock 54 into a series of rings without removal of the stock from the arbor. In accordance with another alternative, a number of cutting wheels, spaced along the length of an elongated shaft may be utilized to cut a plurality of rings simultaneously.

Turning now to FIGS. 3–6, there is illustrated an apparatus 80 for joining the ring 14 and the external tube 12. The apparatus 80 includes a vertical support shaft 82 for receiving the ring and the tube and holding these elements during the bonding operation. The outside diameter of the shaft 82 is such that a sliding, frictional fit is obtained with the interior surface of the tube 12. The shaft 82 has a blunt tip 84 and is rotatably mounted, by means of a double roller bearing 86, in a suitable support means 88. A sleeve 90, made of a high friction material such as rubber or the like, is fastened about the lower, depending portion of the shaft 82.

On its intermediate portion, the shaft 82 is provided with an outwardly projecting shoulder 94 which, in the typical case wherein the shaft 82 is constructed of a conductive material such as steel, comprises the upper planar edge of an insulating sleeve 96 secured about the shaft 82. A recess 98, extending longitudinally for a distance along the length of the shaft 82 and overlapping with the sleeve 96, is provided for receiving an insulating sleeve 100 whose outer surface is flush with the outer surface of the shaft 82.

Figure 3:
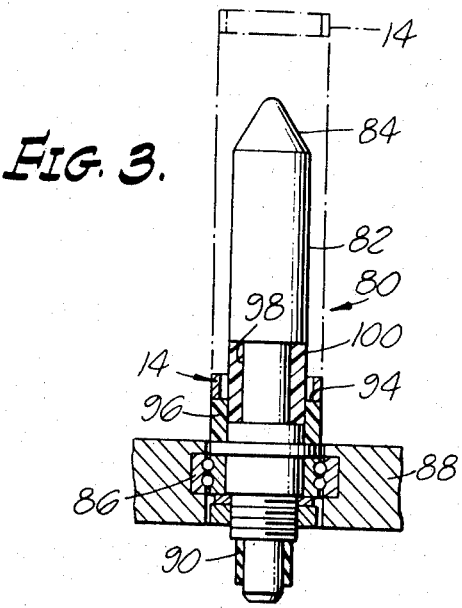
FIGS. 3, 4 and 5 are elevation views, in cross section, of an applicator tube support device used in the assembly of the tube and ring, each figure depicting a stage in the assembly process.

In utilizing the apparatus 80 for the assembly of a given tube 12 and ring 14, the ring 14 is first dropped onto the shoulder 94 as shown in FIG. 3. It is not necessary that the ring be positioned on the shoulder 94 concentrically with the shaft 82; in the typical case, the ring 14 will end up somewhat off-center.

Figure 4:
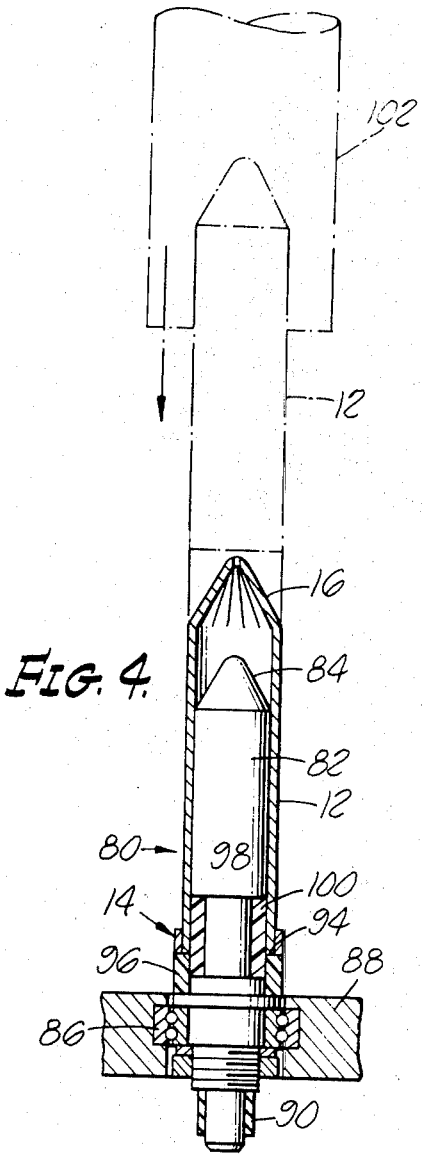

As shown in FIG. 4, the next step involves sliding the external tube 12 down over the shaft 82 until its rear extremity comes into contact with the shoulder 94. A tube holding element 102, shown in phantom, engaging the exterior surface of the tube 12 and appropriately actuated, may be used for this operation. At that point, the ring 14 will have automatically centered and telescoped over the rear portion of the tube 12 with its rear extremity flush with the rear edge of the tube 12 as depicted by the solid lines in FIG. 4.

Figure 5:
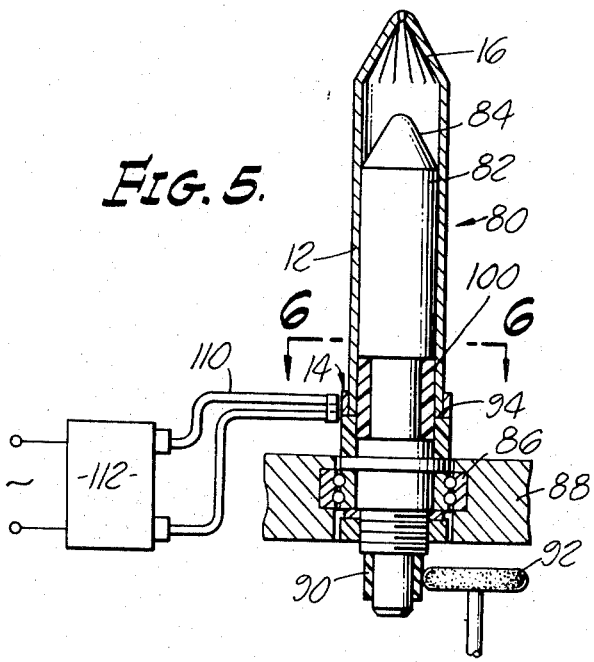

The external tube 12 is shown in FIGS. 3–5 as having already been provided with the tapered tip 16. It will be appreciated however, that the formation of the tip 16 may take place after the ring has been bonded in place on a plain, cylindrical tube.

Figure 6:
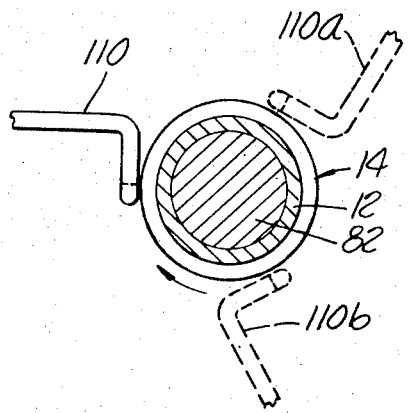
FIG. 6 is a transverse cross-section view of the applicator tube support device, as depicted in FIG. 5, taken along the plane 6—6.

In the bonding operation, shown in FIGS. 5 and 6, a primary coil 110 of an induction heating unit 112 is brought into position adjacent the outer surface of the ring 14 for heating the foil. A number of different primary coil configurations will suggest themselves to those skilled in the art; the coil 110 depicted in the drawings is generally L-shaped with the outer, bent segment positioned about ½₂ inch from the outside surface of the ring 14 so that a concentrated or localized portion of the foil 38 will be heated. As is well known, in induction heating, eddy currents are induced in a secondary conductor by a primary coil. In the present case, the secondary conductor comprises the foil 38. The heat produced by the eddy currents, as a result of the alternating magnetic flux, raises the temperature of the foil sufficiently to melt the thermoplastic resin coating 40 in contact with the exterior surface of the tube 12 thereby fusing the coating and hence, bonding the ring to the tube. The induction heating unit 112 may be of a type commercially available such as that manufactured and sold, for example, by Reeve Electronics, Inc., Chicago, Ill., U.S.A. An induction heating unit having a power output of about one kilowatt at a frequency of 2.5 mHz. has been used with satisfactory results in one practical example.

The ring and the tube may be bonded by fusing the thermoplastic resin in a number of places spaced about the tube 12. This may be accomplished by intermittently rotating the shaft 82 by means of a suitably driven, friction drive wheel 92, brought into engagement with the sleeve 90, and energizing the induction heating unit 112 during dwell periods. Alternatively, the unit 112 may be kept in constant operation and with the shaft 82 in continuous rotation, an unbroken bond between the ring and tube is formed all the way around. Another alternative, in which the shaft 82 is held stationary, is to provide a plurality of induction heating coils 110, 110a, 110b, and so forth, spaced at angular intervals about the shaft 82, as shown in FIG. 6, to thermally join the ring and the tube simultaneously at a plurality of spaced locations.

The support means 88, in a practical production machine, can take the form of an intermittently rotatable turret which is moved through a series of dwell stations at which the various operations which have been described take place. Apparatus of this general nature has been described in detail in U.S. Pat. No. 3,568,577, referenced earlier.

While there have been described above and illustrated in the drawings various forms of reinforcing rings for tampon applicator tubes and apparatus and methods for bonding the tube and ring, it will be appreciated that a number of other modifications and alternative arrangements are possible. Accordingly, the invention should be considered to include all modifications, variations and alternative forms falling within the scope of the appended claims.

What is claimed is:

1. A method of attaching a reinforcing ring to a thin-walled, hygienic medium applicator tube, said ring and said tube each having a central longitudinal axis, said tube having a tapered end and an opposite end, a portion of said opposite end receiving said ring, said ring including a ply of electrically conductive foil having coated on its interior surface a thermal bonding agent which softens upon being heated and sets upon cooling, the inside diameter of said ring being dimensioned to provide a sliding, frictional fit with the outside diameter of the applicator tube, said method comprising the steps of:

restraining said ring to prevent axial movement thereof in one direction along a longitudinal reference axis parallel with the central axis of said ring but permitting limited eccentric movement of said ring relative to said reference axis, said eccentriicty being limited to a distance approximately equal to the thickness of the wall of said applicator tube;

moving said tube linearly in said one direction toward said ring with said opposite end directed toward said ring, said tube being restrained to maintain said tube axis in coincidence with said reference axis and continuing said movement of said tube until said opposing end portion of said tube telescopes within said ring; and heating said conductive material to a temperature sufficient to soften said thermal bonding agent to effect a bond between said ring and said tube.

2. A method, as defined in claim 1, in which:

the bonding of the ring to the tube is effected at a plurality of spots about said ring by rotating said support through a plurality of dwell positions and heating a localized area of said foil by induction at each dwell position.

3. A method, as defined in claim 1, which includes the step of:

heating the conductive material in one spot thereof by induction and continuously rotating said support to form a substantially continuous bond between the ring and the tube about the entire circumference of the tube.

4. A method, as defined in claim 1, in which:

said heating is applied simultaneously to a plurality of angularly spaced, localized areas of the foil.

References Cited
UNITED STATES PATENTS

| | | | |
|---|---|---|---|
| 3,347,234 | 10/1964 | Voss | 128—263 X |
| 3,433,225 | 3/1969 | Voss et al. | 128—270 |
| 2,642,911 | 6/1953 | Shazor, Jr. | 156—272 |
| 3,175,281 | 3/1965 | Elfsten | 29—282 X |
| 2,353,008 | 7/1944 | Bondeson | 29—282 |

CARL D. QUARFORTH, Primary Examiner

E. E. LEHMANN, Assistant Examiner

U.S. Cl. X.R.

128—263; 156—275, 290, 293

UNITED STATES PATENT OFFICE
CERTIFICATE OF CORRECTION

Patent No. 3,695,970  Dated October 3, 1972

Inventor(s) Joseph A. Voss et al

It is certified that error appears in the above-identified patent and that said Letters Patent are hereby corrected as shown below:

Column 1, line 55, delete "now". Column 2, line 26, delete "Application". Column 4, line 15, delete "now". Column 5, line 9, after "described" insert --in detail in the aforementioned--. Column 7, line 19 (claim 1) "attacking" should be --attaching--.

Signed and sealed this 20th day of November 1973.

(SEAL)
Attest:

EDWARD M. FLETCHER, JR.
Attesting Officer

RENE D. TEGTMEYER
Acting Commissioner of Patents